Nov. 10, 1959 A. F. FALLON 2,911,869
SPLINED ARBOR
Filed Jan. 24, 1955
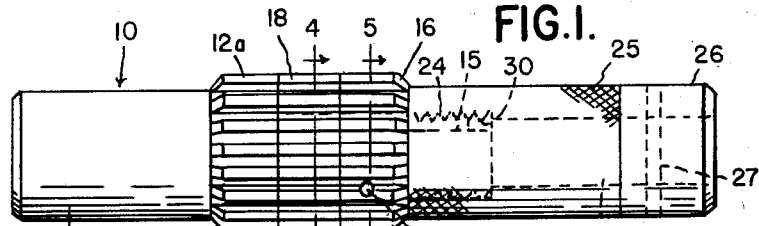
FIG.1.
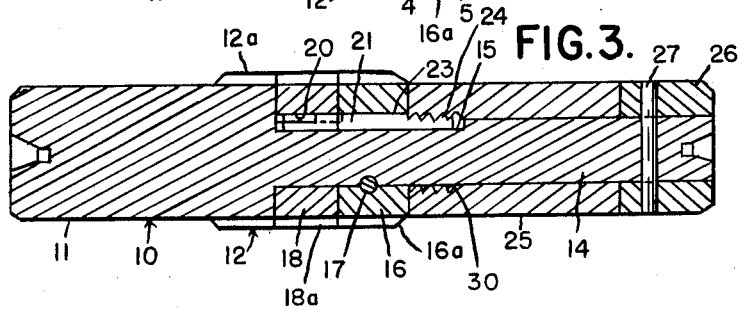
FIG.3.
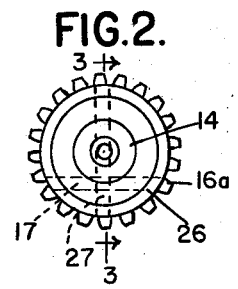
FIG.2.
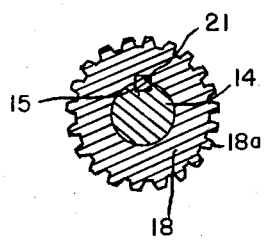
FIG.4.
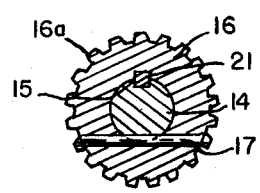
FIG.5.
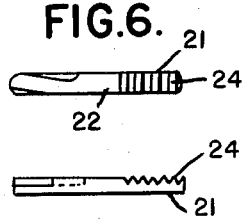
FIG.6.
FIG.7.
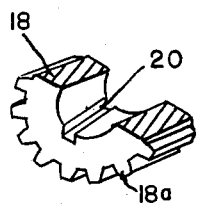
FIG.8.
*INVENTOR.*
ALBIN F. FALLON
BY
*Hauke & Hardesty*
ATTORNEYS

# United States Patent Office 2,911,869
Patented Nov. 10, 1959

2,911,869

SPLINED ARBOR

Albin F. Fallon, Grosse Pointe, Mich.

Application January 24, 1955, Serial No. 483,731

3 Claims. (Cl. 82—43)

My invention relates to arbors, and more particularly to that type known throughout the trade as splined arbors.

In the manufacture of gears or the mounting of gears and pinions on shafts and the like, it is observed that such gear blanks which are internally splined to be mounted or centered on a splined arbor are not securely centered because of the fact these internal splines are machined with a tolerance of some two or five-thousandths, resulting in a limited amount of play. To overcome the aforesaid difficulties, I have devised an arbor construction operable to securely fix and center the internally splined workpiece on said arbor.

It is an object of my invention to overcome the difficulties attendant in the application and use of splined arbors in the making of gears, pinions and the like by providing an adjustable splined arbor readily usable for production and which can be more readily and securely locked in adjustment, whereby to positively hold the workpiece securely centered on the arbor.

Further objects of my invention are to provide an improved adjustable arbor for supporting a workpiece by constructing same with an improved and simplified adjusting mechanism, more particularly constructed to adjust an intermediate toothed ring relative to the annular toothed portion of the arbor support, whereby to more securely hold the workpiece centered on the arbor.

For a more detailed understanding of my invention, reference may be had to the accompanying drawing illustrating a preferred embodiment of my invention in which like characters refer to like parts throughout the several views, and in which Fig. 1 is a side elevational view of an adjustable arbor constructed in accordance with the principles of my invention.

Fig. 2 is an end view thereof.

Fig. 3 is a longitudinal sectional view taken on the line 3—3 of Fig. 2.

Figs. 4 and 5 are transverse sectional views taken respectively on the lines 4—4 and 5—5 of Fig. 1.

Fig. 6 is a plan view of the key.

Fig. 7 is a side elevational view of the key, and

Fig. 8 is a fragmentary detail view in perspective of the intermediate adjustable splined member showing the laterally inclined keyway.

The arbor as herein illustrated is particularly adapted for small bore workpieces and is quite simplified in construction. It comprises a support 10 consisting of a drive shank 11, a splined head portion 12 and a reduced diameter shaft 14, said shaft having a keyway slot 15 extending from the head portion 12 part way along said shaft.

An annular sleeve or ring member 16 is axially spaced from the head 12 and is pinned or otherwise secured or fixed to the shaft as at 17. An intermediate sleeve or ring member 18 is rotatably supported on the shaft 14 and lies between the head 12 and ring member 16. The head is externally splined as at 12a, the ring member 16 is externally splined as at 16a and the ring member 18 is externally splined as at 18a. The splines 12a and 16a are axially aligned and the splines 18a are also substantially axially aligned with respect to said splines 12a and 16a, and the arbor is thus adapted to fit the internal splined bore of a gear blank or other workpiece.

The intermediate splined ring member 18, which is rotatable on said shaft 14, is constructed to be angularly adjusted to hold and center the workpiece on the support. The member 18 is provided with a helical groove 20 in the bore about said shaft 14 and a key 21 is longitudinally movably supported in the keyway 15 of the shaft portion 14.

One end of the key which lies within the axial bore of member 18 is laterally inclined to fit into the helical slot or groove 20, the middle portion 22 of the key fitting into a keyway slot 23 in the bore of member 16, and the other end of said key being externally threaded as at 24. A knurled sleeve 25 is rotatably supported by the shaft 14 and is held in place thereon by the lock sleeve 26 which is preferably secured on said shaft by a pin 27 or other suitable fastening means.

The inner end of the bore of sleeve 25 is threaded as at 30 and the threaded connection between sleeve 25 and key 21 makes it possible to longitudinally move the key 21 in said keyway 15 on turning or rotating the sleeve 25, thus angularly adjusting the intermediate splined ring 18 to hold and center the workpiece on said arbor.

It will be apparent to those skilled in the art to which my invention pertains that various changes and modifications may be made herein without departing from the spirit of my invention or from the scope of the appended claims.

I claim:

1. A spline arbor comprising a support having an externally splined head portion and an axially extended shaft having an external longitudinally extended keyway, an externally splined annular member rotatably supported on said shaft, another annular member secured on said shaft and having external splines axially aligned with the splines on said head portion of the support, said rotatably supported member disposed intermediate said second annular member and said head portion and having a helical internal keyway, and a single key slidably carried in said keyway groove and provided with a key portion at one end inclined to the longitudinal and engaging said helical groove, and a sleeve rotatably supported on said shaft and having an enlarged diameter screw thread bore enclosing a second key portion at the other end of said key, said second key portion enclosed in said bore having threads engaging said threaded sleeve whereby said first mentioned annular member is angularly adjusted with respect to said support and said second annular member on rotating said sleeve, and a collar fixed to the extreme end of said shaft to complete the assembly and clamp said annular members and said sleeve on said shaft against longitudinal displacement.

2. A spline arbor comprising a support provided with an externally splined head and an axially extended shaft having an external longitudinally extending keyway groove, a pair of annular members mounted on said shaft and having axially aligned external splines substantially axially aligned with respect to the splines on said head, one of said members having an internal key slot parallel to the shaft axis, the second of said members having a key slot laterally inclined with respect to the shaft axis, a single key longitudinally slidably carried in said keyway groove and having a straight medial key portion engaged with said first member key slot for locking said first member to the shaft against angular displacement on said support, said key having an inclined portion at one end engaged in the inclined key slot of said second member, an external threaded portion at the other end of said key, and means for longitudinally adjusting said key comprising an internally threaded sleeve rotatably supported on said shaft and secured against longitudinal displacement, said sleeve rotated and acting to longitudinally adjust said key by reason of the threaded engagement of said sleeve and key to thereby angularly adjust said second member having the inclined key slot with respect to said other member and said head to engage said splines with the internal splines on a workpiece to hold same centered on said support.

3. A spline arbor comprising a support provided with an integral externally splined head and an axially extended shaft having an external longitudinally extending keyway, an annular member non-rotatably locked to said shaft and axially spaced from said head, external splines on said annular member and axially aligned with the splines on said head, a second annular member rotatably mounted on said shaft intermediate of said first member and said head and provided with external splines substantially axially aligned with the splines of said head and first member, said rotatable member having an internal helical keyway slot said non-rotatable member having an internal straight axial keyway slot, a key longitudinally movably supported in said keyway groove and said non-rotatable member axial keyway slot and having a helical projection at one end engaging in the helical keyway slot of said rotatable member, and means for longitudinally moving said key to angularly adjust said rotatable member with respect to said non-rotatable member and said head, whereby to engage the splines of said members and head with matching internal splines on a workpiece to hold same centered on said support, said means comprising a sleeve rotatably mounted on said shaft and abutting said non-rotatable member, a locking collar secured to said shaft to lock said sleeve on said shaft against longitudinal displacement, said sleeve having an internally threaded counterbore at said end abutting said non-rotatable member, said key being externally threaded at the end opposite to that end portion carrying said helical projection, said threaded sleeve engaging the threaded key to longitudinally adjust the key on rotating the sleeve to angularly adjust said rotatable member.

References Cited in the file of this patent

UNITED STATES PATENTS

| | | |
|---|---|---|
| 688,687 | Printz | Dec. 10, 1901 |
| 2,037,454 | Boecking | Apr. 14, 1936 |
| 2,372,931 | Bregin | Apr. 3, 1945 |
| 2,445,184 | Parker | July 13, 1948 |
| 2,555,496 | Mackmann | June 5, 1951 |
| 2,658,764 | Parker | Nov. 10, 1953 |
| 2,665,136 | Fallon | Jan. 5, 1954 |
| 2,762,629 | Dalby | Sept. 11, 1956 |